United States Patent [19]

Healy

[11] Patent Number: 4,934,745
[45] Date of Patent: Jun. 19, 1990

[54] FLEXIBLE HOSE COUPLING

[75] Inventor: Mark Healy, Orlando, Fla.

[73] Assignee: Senninger Irrigation, Inc., Orlando, Fla.

[21] Appl. No.: 393,368

[22] Filed: Aug. 14, 1989

[51] Int. Cl.⁵ .............................................. F16L 33/22
[52] U.S. Cl. ..................................... 285/255; 285/906
[58] Field of Search ................. 285/921, 12, 258, 255, 285/906

[56] References Cited

U.S. PATENT DOCUMENTS

| | | | |
|---|---|---|---|
| 2,902,299 | 9/1959 | Turner | 285/258 |
| 3,262,721 | 7/1966 | Knight | 285/921 X |
| 4,006,923 | 2/1977 | Wagner | 285/258 X |
| 4,313,628 | 2/1982 | Duenke | 285/921 X |
| 4,722,556 | 2/1988 | Todd | 285/12 |
| 4,798,404 | 1/1989 | Iyanicki | 285/12 |

Primary Examiner—Dave W. Arola
Attorney, Agent, or Firm—William M. Hobby, III

[57] ABSTRACT

A flexible winding hose coupling apparatus is provided which allows for the rapid coupling of a flexible hose thereinto. The coupling can then be attached to another hose or to a pipe fitting or tap. The coupling has first and second coupling members with the first coupling member having a hollow tapered bore therein and the second coupling member loosely fitting or floating in the bore of the first coupling member. The first coupling member has an annular ledge formed in the bore to act as a stop for the second coupling member and has a plurality of annular barbs formed along the bore walls. The second coupling member is located in the first and has an external taper thereon with a plurality of external annular barbs therearound so that sliding a flexible hose over the second coupling member expands the end of the hose along the taper and over the barbs, driving the end of the hose towards the inside of the first coupling member bore walls. The enlarged hose seals when an internal hydraulic pressure is applied thereto or with a reverse pull on the hose, once the hose is pushed over the second coupling member, by the second coupling member and hose thereon sliding toward the tapered barbed internal wall of the first coupling.

4 Claims, 1 Drawing Sheet

U.S. Patent
Jun. 19, 1990
4,934,745
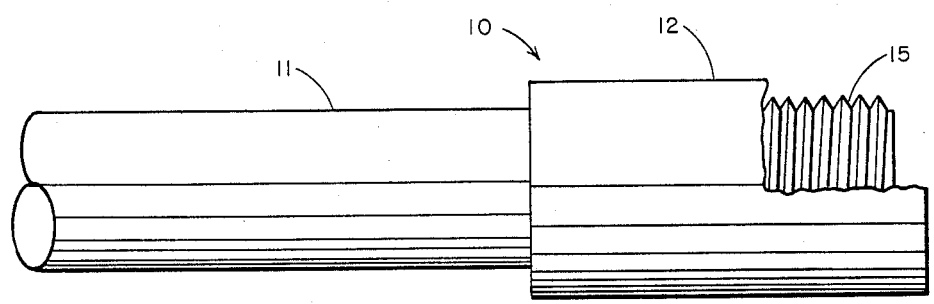
FIG. 1
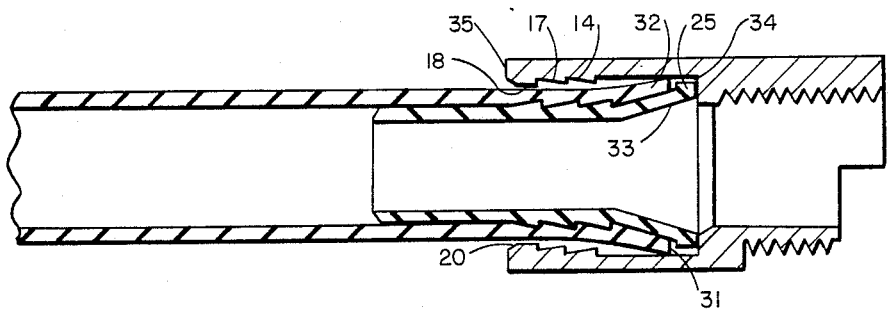
FIG. 2
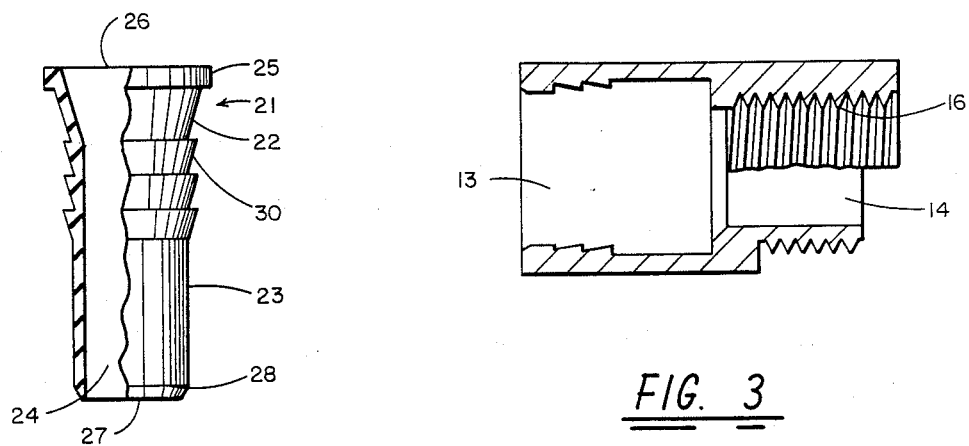
FIG. 3
FIG. 4

FLEXIBLE HOSE COUPLING

BACKGROUND OF THE INVENTION

The present invention relates to a flexible hose coupling which provides a swiveling connection for the hose and especially to a hose coupling which merely requires the hose end to be slipped into the coupling to form a swiveling hose coupling.

In the past, numerous fittings and couplings have been provided for interconnecting hoses or tubes to each other or to pipe or hose fittings. Flexible hose, such as garden hose and irrigation hose, which carry water under pressure require a tight seal. This has been accomplished through the use of washers, adhesives, packings, and sealing compounds, as well as pressure and clamp couplings. Typically, a flexible rubber or plastic hose is connected to a metal coupling using various clamping techniques. Replacement couplings are frequently attached by sliding the hose over a rigid ribbed insert sized for the inside diameter of the hose and a threaded clamp clamped onto the outside of the hose to clamp the hose onto the rigid insert. Other techniques allow for the end of the hose to be slipped between a pair of coaxial cylindrical members which will provide an annular insert between concentric metal cylinders for inserting the flexible hose and then clamping the outer cylinder to clamp cylinder onto the hose.

In addition to the conventional commercial couplings and attachments for attaching a flexible hose to either a hose end or to another piece of hose or to a threaded or other connector, a variety of U.S. patents have claimed various clamping techniques. A prior art coupling device can be seen in the Schmitt U.S. Pat. No. 3,679,239, for a compression coupling for plastic pipe which allows the pipe end to be slid into the coupling for locking the pipe in the coupling, and in the Elek U.S. Pat. No. 3,381,982 for a plastic fitting assembly for inserting each end of a plastic pipe into an adapter insert which is barbed and then using a threaded compression nut for compressing the pipe thereunto. In the Byrne et al., U.S. Pat. No. 4,043,857, a method of joining a plastic pipe includes a cylindrical pipe insert having a separate outer sleeve member so that the pipe can be slid between the sleeves and heat fused. In the Shippey et al., U.S. Pat. No. 3,934,906, means are provided for coupling and sealing membrane carrying tube sections using a barbed insert in an outer sleeve. In the Weatherhead U.S. Pat. No. 3,433,505, a hose fitting for connecting hoses of different sizes provides for inserts and outer sleeves which are clamped onto the flexible hose slid onto the inserts. The Raybould U.S. Pat. No. 2,460,653, provides a hose end in which a hose can be inserted over an insert having an annular ledge on one end and a threaded compression nut that slides over the hose to clamp a compression member onto the hose. The Ridenour U.S. Pat. No. 4,231,596, is a tubular joint assembly having an annular ledge insert which is slid into a tube and has a sleeve that fits over the tube and over the insert. The Emmitt U.S. Pat. No. 609,738, is for a pipe coupling in which the ends of the pipe are slipped between a threaded insert and a clamping outer sleeve. The Osmun U.S. Pat. No. 2,202,261, has a barbed insert for forming a safety joint. The Raybould U.S. Pat. No. 2,464,416, shows a hose end coupling which slides the hose on an insert having a slight taper portion on one end and having a threaded clamping nut for clamping onto the hose. The Patterson and Gregory U.S. Pat. No. 825,480, is for a nozzle coupling in which a hose is slipped over a barbed pipe insert and has a threaded pressure coupling on the outside for compressing the pipe onto the barbed insert. The Miller U.S. Pat. No. 960,667, is for a pipe coupling in which a lead pipe is attached to a raw iron pipe. The Johnson U.S. Pat. No. 4,589,688, is for a plumbing hook-up kit in which a pipe is slid over a barbed insert and clamped thereon.

The present invention provides for a flexible hose coupling which has been simplified such that a flexible hose can be slid over an axially floating tapered and barbed hollow insert and at the same time into a tapered barbed cylinder so that the flexible hose is enlarged as it slides onto the tapered insert but may still be swiveled with the insert but provides a water-tight seal when internal hydraulic pressure is applied to the coupling joint or by pulling on the hose once it has been inserted onto the tapered insert and inside the tapered cylinder.

SUMMARY OF THE INVENTION

A flexible hose coupling has first and second coupling members. The first coupling members has a hollow bore therein which is tapered and has an annular ledge formed therein a predetermined distance from one end thereof. The first coupling member has a plurality of annular barbs formed therein along the tapered bore wall. The second coupling member is located to be free-floating within the first coupling member bore and protruding out the end thereof to form an axially floating insert having an external taper and a plurality of external annular barbs therearound along the tapered surface. The second coupling member has an annular external ledge formed therearound at the enlarged end portion of the tapered insert to allow one end of a flexible hose to be slid over the second coupling member insert portion and over the annular ledge and onto the tapered insert to enlarge the end of the flexible hose to expand the hose toward the internal wall of the first coupling member after it passes through the smallest portion of the taper bore of the first coupling member. The floating second coupling member is forced under hydraulic pressure to drive the end of the expanded flexible hose into the barbed tapered bore wall of the first coupling member to provide a liquid seal between the flexible hose and the first coupling member. The first coupling member may have a second coupling portion on the other end thereof or may have threaded connectors for attaching to another coupling on the pipe or onto a pipe tap or outlet as desired.

BRIEF DESCRIPTION OF THE DRAWINGS

Other objects, features, and advantages of the present invention will be apparent from the written description and the drawings in which:

FIG. 1 is a side elevation of a pipe coupling in accordance with the present invention showing a male thread on the top portion and a female thread on the lower half having a flexible hose attached thereto;

FIG. 2 is a side sectional view taken through the hose coupling of FIG. 1;

FIG. 3 is a sectional view taken through the outer sleeve coupling member of FIGS. 1 and 2; and FIG. 4 is a cutaway side elevation of a floating insert of the hose coupling in accordance with FIGS. 1 and 2.

DETAILED DESCRIPTION OF THE PREFERRED EMBODIMENT

Referring to the drawings, a flexible hose coupling 10 can be seen having a flexible hose 11 attached thereto in FIG. 1 and having an outer housing or coupling member 12 which is a sleeve having a bore 13 extending into one end and a bore 14 extending into the other end to provide a passageway through the coupling member 12. External threads 15 can be provided on the one end of the coupling member 12 for attaching the coupling member to another coupling member or pipe connection or, alternatively, internal threads 16 may be provided as desired. In addition, both ends can be configured for coupling a pair of hoses 11 to each end.

The outer coupling portion 12, bore 13 has inner walls 14 which taper from a stop ledge 34 to the annular rim 35 around the outlet from the bore 13 as seen in FIGS. 2 and 3. In addition to tapering, the bore 13, walls 14 have a plurality of annular barbs or serrations 17 therearound. The taper and the barbs are such that the opening to the bore has an annular surface 18 which is the smallest part of the bore 13 but may have a slight tapered edge 20 to ease the insertion of the hose 11. A second coupling member or insert 21 is a floating insert which is not physically attached to the coupling member 12. The floating insert 21 has a tapered portion 22 connected towards a slight cylindrical portion 23 and has a bore 24 passing therethrough. The taper portion 22 ends in an annular ledge 25 around the end portion 26 of the insert 21. The end portion 27 may have a slight tapered edge 28 to ease the sliding of the end of the hose 11 thereover. A plurality of annular barbs or serrations 30 extend around the exterior of the insert 21 starting with the end of the cylindrical portion 23 and extending along the tapered portion 22.

As seen in FIG. 2, the insert 21 is placed with its largest end 26 located inside the coupling member 12. The largest portion of the bore 13 has the cylindrical portion 23 of the insert 21 extending through the smallest portion of the bore 13 and protruding outside the end 16 of the first coupling member 12.

The free-floating insert 21 as seen in FIGS. 2 and 4 is not attached to the coupling member 12 and will slide therein until the annular ledge 25 abuts the ledge 34 at one end and will slide in the other direction until annular ledge 25 abuts against one of the annular barbs 17 on the tapered surface. The insert 21 can also rotate freely in the coupling member housing 12.

In operation, a hose 11 having a cut end 31 is slipped onto the insert 21 with cylindrical portion 23 and is helped with the inclined edge 28 and is slid along the insert 21 and through the narrowest portion 18 of the bore 13 of the outer coupling member 12 where it is sized to slide therethrough as the hose 11 is pushed or shoved onto the insert 12. It slides over the barbs 30 and along the taper 22 to expand or enlarge the hose end 32 until the edge 31 of the hose 11 abuts the annular ledge 25 of the insert 21. This, of course, has pushed the insert end 26 adjacent the annular stop 34 in the outer coupling member 12 and has pushed the end of the hose 31 against the internal bore wall 14 of the coupling 12.

At this point, a tight seal can be made between the hose 11 and the coupling 10 by either pulling the hose 11 in a reverse direction as if pulling it out of the coupling 10 in which case the barbed insert 21 attempts to slide out of the outer coupling 12 as the tapered portion 22 of the insert 21 is pulled towards the tapered internal wall of the coupling member 12 bore 13 to drive the large part of the hose 32 against the walls of the internal bore. Alternatively, internal hydraulic pressure, such as water under pressure, will apply a force against the insert 21 and especially against the internal tapered wall portion 33 to drive the insert 21 in hose 11 away from the stop 15 to drive the enlarged portion 32 of the hose 11 against the internal wall 14 of the bore 13 to provide a water-tight seal between the hose 11 and the coupling 10. Once the hose 11 is attached to the coupling 10, it cannot then thereafter be removed without damaging the hose or coupling but the hose 11 can very rapidly pushed onto the insert 21 in the coupling 10 to form a water-tight seal which is also a swiveling seal in that the insert 21 can then rotate if the hose 11 rotates since the insert 21 is free-floating and not physically attached to the outer coupling portion 12.

It should be clear at this time that a flexible hose coupling has been provided which can be inexpensively manufactured, and rapidly attached to a flexible hose to provide a swiveling connection. However, it should be clear that the other end of the hose coupling can have a further coupling, such as an internal or externally threaded end or a repeat of the first coupling section for attaching hoses to either side thereof, without departing from the spirit and scope of the invention. Accordingly, the present invention is not to be considered limited to the forms shown which are to be considered illustrative rather than restrictive.

I claim:

1. A flexible hose coupling comprising:
a first coupling member having a hollow bore therein and an annular ledge formed along the inside bore of said first coupling member a predetermined distance from one end of said first coupling member, said first coupling member having a plurality of annular barbs formed therein along said bore wall;
a second coupling member located in said first coupling member bore and forming an axially floating insert having an external taper and having a plurality of external annular barbs therearound, said second coupling member having an annular external ledge formed therearound on one end portion thereof, said external ledge having a larger external diameter than the internal diameter of said one end of said internal ledge whereby one end of a flexible hose coupling can be end slid over said second coupling member to said annular ledge thereon while being expanded on the taper of said second coupling member toward the internal wall of said first coupling member to thereby seal said flexible hose in said flexible hose coupling upon application of a hydraulic pressure in said coupling member or upon tension being placed upon said flexible hose;
said first coupling member being tapered along said internal bore in the same angular direction as the said second coupling member external taper relative to the central axis thereof; and
said first coupling member having a threaded end portion thereon for coupling to a threaded connector.

2. A flexible hose coupling in accordance with claim 1 in which said first coupling member threaded end portion is a hose coupling internal threaded end for attaching said coupling to an external threaded connector.

3. A flexible hose coupling in accordance with claim 2 in which said first coupling member threaded end portion has external threads therearound.

4. A flexible hose coupling in accordance with claim 3 in which said first coupling member threaded end portion has an internal bore therein and internal threads therearound.

* * * * *